Figure 1:
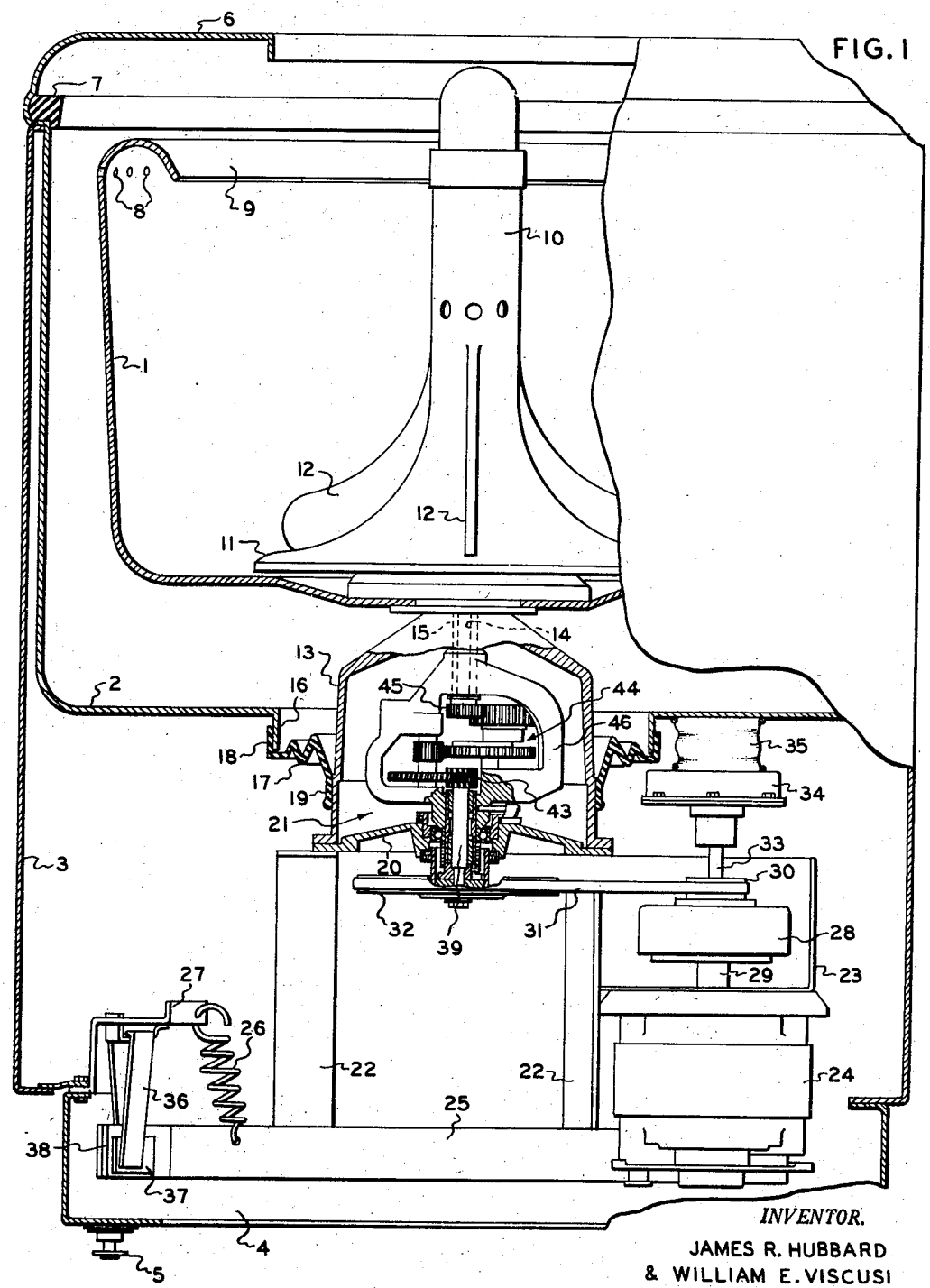

July 22, 1958    J. R. HUBBARD ET AL    2,844,225
DRIVE MECHANISM FOR CLOTHES WASHERS AND THE LIKE
Filed April 2, 1954    2 Sheets-Sheet 1

INVENTOR.
JAMES R. HUBBARD
& WILLIAM E. VISCUSI
BY
THEIR ATTORNEY

July 22, 1958　　　J. R. HUBBARD ET AL　　　2,844,225
DRIVE MECHANISM FOR CLOTHES WASHERS AND THE LIKE
Filed April 2, 1954　　　　　　　　　　　2 Sheets-Sheet 2
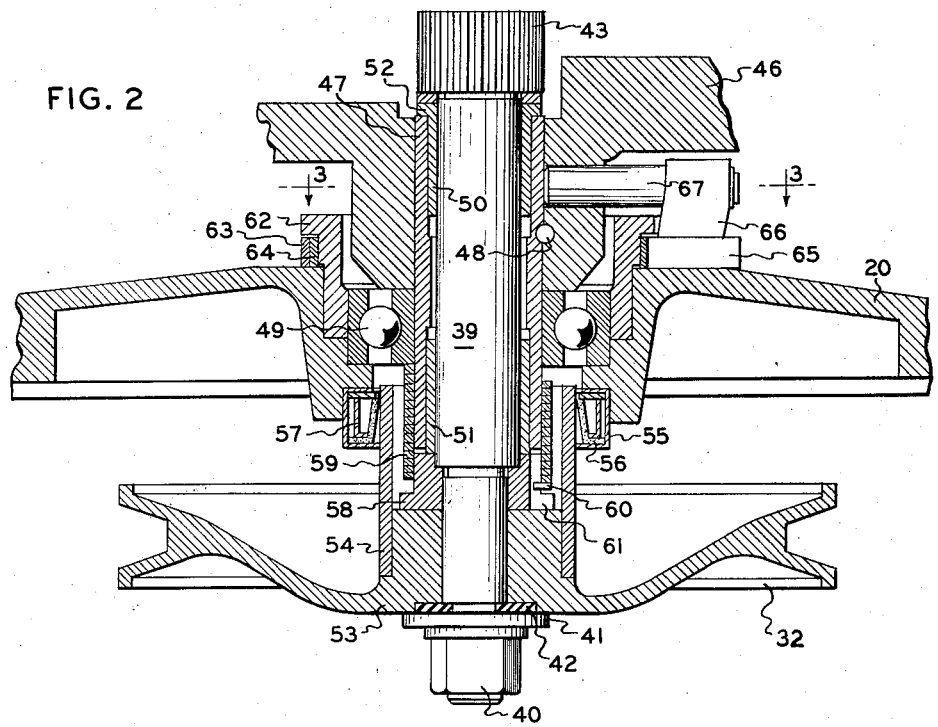
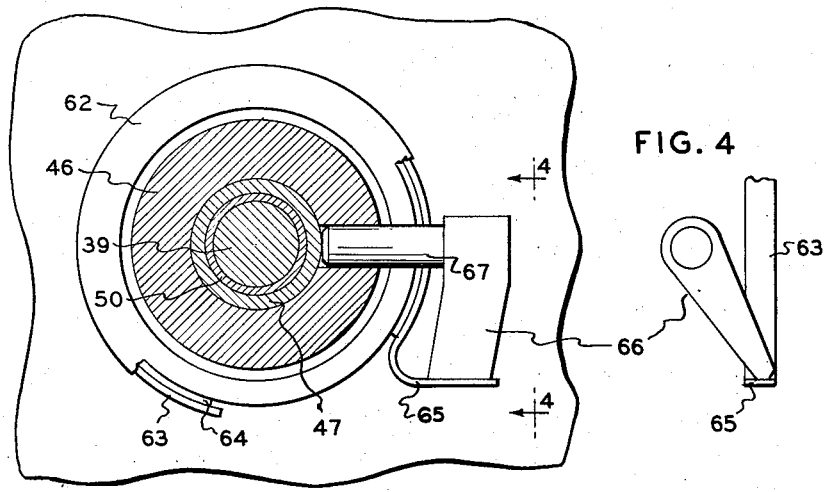
INVENTOR.
JAMES R. HUBBARD
& WILLIAM E. VISCUSI
BY
THEIR ATTORNEY

United States Patent Office 2,844,225
Patented July 22, 1958

2,844,225
DRIVE MECHANISM FOR CLOTHES WASHERS AND THE LIKE

James R. Hubbard, Trenton, N. J., and William E. Viscusi, Louisville, Ky., assignors to General Electric Company, a corporation of New York Application April 2, 1954, Serial No. 420,594

4 Claims. (Cl. 188—82.4)

This invention relates to clothes washers, and more particularly to a drive mechanism for such machines to provide selectively washing action and centrifugal extraction.

Our invention is directed specifically to washer drive mechanisms of the type including a single input shaft, which are arranged to produce, dependent upon direction of rotation of the input shaft, a drive for the shaft of the washing means, or a drive to the centrifugal extractor shaft. Automatic control of the machine is facilitated by such mechanisms since selection of washing action or centrifugal extraction is accomplished merely by controlling direction of rotation of the driving motor.

An object of our invention is to provide an improved drive mechanism of this type including an advantageous braking means which is self-energizing to restrain the centrifugal extraction shaft and clothes basket during the washing or agitation period, and which is self releasing when the centrifugal extraction shaft is driven.

Another object of our invention is to provide a drive mechanism including braking means for the spin shaft, which mechanism is mounted in a sealed casing having a lubricant charge therein and in which the engagement and release of the braking means is effected by means of the reaction between a movable member attached to the spin shaft and the lubricant charge in the casing.

In carrying out our invention in accordance with one aspect thereof, a drive mechanism is provided for a clothes washing machine of the type having a clothes basket rotatable for centrifugal liquid extraction, with agitation means within the basket independently driven to provide washing action while the basket is held stationary. The input driving shaft from a reversible motor drives a transmission for the agitator, which transmission is mounted in a gear frame rotatable with and forming a part of the concentric spin basket shaft. A clutch means is interposed between the input drive shaft and the concentric spin shaft to connect the shafts together automatically on one direction of input rotation for centrifugal extraction, and which clutch overruns on opposite input rotation so that only the agitation means are driven. The invention features an automatic self-operating brake enclosed within a sealed casing surrounding at least the gear frame structure. A brake band, frictionally engaging the stationary casing, includes a projecting operating tab arranged for engagement by a snubber member pivotally mounted on the spin tube. This snubber member is formed with an airfoil shape to be acted upon by the charge of lubricant within the sealed casing to direct the snubber out of engagement with the brake tab on spin rotation and into engagement therewith on agitation rotation.

The features of our invention which we believe to be novel are set forth with particularity in the appended claims. The invention itself, however, both as to its organization and method of operation, together with further objects and advantages thereof, may best be understood by reference to the following description taken in connection with the accompanying drawings, in which Fig. 1 is a vertical elevation, partially in section and with portions thereof broken away, of an automatic washing machine embodying our invention; Fig. 2 is an enlarged cross sectional view of a portion of the transmission illustrated by Fig. 1; Fig. 3 is a cross sectional view taken on the line 3—3 of Fig. 2 in the direction of the arrows; and Fig. 4 is a cross sectional view taken on the line 4—4 of Fig. 3.

The present invention is directed particularly to an automatic clothes washing machine wherein it is necessary to provide from a single driving or power source an agitation or washing motion of one shaft and a centrifugal extraction motion of a second driven shaft. Therefore, we have shown our invention as embodied in an automatic clothes washer, although it is not necessarily limited solely thereto. In Fig. 1 of the drawings, a clothes washer is illustrated as having a rotatable clothes basket 1 within an enclosing tub 2, which in turn is supported on and enclosed by an outer cabinet structure 3. The cabinet structure is supported upon a base structure 4 having a plurality of adjustable supporting feet 5. Cabinet 3 further may include a cover structure 6 with a sealing gasket 7 at the junction between the cover and the side walls of the cabinet.

Basket 1 is of the type having substantially imperforate bottom and side walls, with the side walls flaring outwardly and upwardly. At maximum basket diameter, a plurality of liquid overflow apertures 8 are located for discharge of water or washing liquid from basket 1 into outer tub 2. The uppermost edge of the basket includes a suitable barrier or retainer ring 9 to prevent projection or flotation of articles from the basket into the outer tub. Independently rotatable but positioned within basket 1 is an agitation means, herein shown as of the type having a center post 10 and outwardly flaring lower skirt 11 from which project a plurality of radially outwardly extending agitating vanes 12. As is now well understood in the art, clothes or articles to be washed may be placed within basket 1 along with a charge of washing liquid and detergent. The machine is then set in operation to oscillate the agitator to provide the desired washing action of washing liquid and detergent with respect to the clothes. Upon completion of the agitation period, basket 1 is rotated at a high speed to extract centrifugally the liquid from the clothes and discharge such washing liquid through apertures 8 into outer tub 2.

The drive for basket 1 and agitator 10 is provided in accordance with this invention by mechanism contained within a transmission casing 13, which also provides supporting bearing structures for an agitator shaft 14 and a spin tube 15. It should be understood that the entire basket assembly is carried by spin tube 15 and is rotatable with respect to tub 2 and casing 13. To receive casing 13, tub 2 is provided with an enlarged central aperture as defined by a downwardly projecting flange 16 clearly shown in Fig. 1. A flexible boot 17 having a plurality of convolutions is secured at 18 to the flange on tub 2 and at 19 to the exterior surface of casing 13. In accordance with well known practice in this art, boot 17 provides a liquid tight seal between casing 13 and the tub while permitting relative movement occasioned by unbalance within basket 1 during centrifugal extraction.

Rigidly secured to casing 13 is a casing base plate 20, thereby defining a complete sealed transmission compartment 21. The entire transmission is supported on a rigid structure including a plurality of vertically disposed bracket members 22, which also have secured thereto a motor supporting bracket 23. A reversible driving motor 24 is secured to bracket 23 and thus forms an integral and rigid part of the transmission and supporting structure. Basket 1, agitator 10, the casing assembly, and motor 24 all taken together form the moving system which is suspended within the cabinet on a transverse framework 25 by a plurality of springs 26 carried on brackets 27, in turn supported by base structure 4. While only one such suspension spring has been shown by Fig. 1, it will be understood that several such springs in equiangularly spaced relationship are employed to suspend the moving system in stable equilibrium, but in a manner permitting relative movement with respect to the stationary portions of the machine, namely the base structure 4, cabinet 3, and tub 2.

Preferably a suitable overload protection clutch device 28 is connected to the motor output shaft 29. Numerous devices of this type are well known in the art and hence the clutch structure is not disclosed in detail herein. It is contemplated however that the clutch device 28 will be of the centrifugal type permitting the motor to start without load, whereby it may rapidly come up to its terminal speed to operate a suitable centrifugal mechanism within the clutch to provide desired driving torque to drive pulley 30. Pulley 30 is connected by means such as flexible belt 31 to rotate an input driving member 32.

Motor 24 also conveniently provides the power source for removing liquid discharged into tub 2. For this purpose, the motor includes a shaft extension 33 driving the rotor of a pump 34. Pump 34 thus becomes a part of the moving system and therefore must be connected to stationary tub 2 by a suitable flexible connection such as 35. Pump 34 is intended to dispose of the liquid in tub 2 to a suitable discharge point exterior of the machine by a conventional hose or other means (not shown).

During the centrifugal extraction operation, distribution of articles of clothing within basket 1 is entirely fortuitous. The resilient suspension utilizing springs 26 permits gyration of the basket about its axis. However, to limit amplitude and reduce the gyrations to a minimum level it is desirable to employ vibration damping means in connection with the suspension. Such a means is shown by Fig. 1 as including a U-shaped member 36 secured to bracket 27, with a pair of friction pads 37 secured to the lower end of each leg of member 36. The transverse supporting member 25 includes an outwardly extending arm portion 38 adapted to be contacted by friction pads 37. The two legs of member 36 are pre-stressed together to provide frictional engagement of pads 37 with arm 38. Preferably one such friction damping assembly is employed in connection with each of the suspension springs 26.

The details of the transmission are shown more clearly in Fig. 2 to which reference is now made. As previously described, pulley 32 is driven from the reversible driving motor 24 by means such as a flexible belt. Pulley 32 is keyed or otherwise secured nonrotatably to a driving input shaft 39 by means such as the nut 40 with bearing and sealing washers 41 and 42 respectively. Shaft 39 extends upwardly, terminating at its upper end in a driving pinion 43 for the agitator drive gear train. Referring again to Fig. 1, pinion 43 drives a gear train indicated generally by the numeral 44 to provide an oscillatory drive to an output agitator pinion 45, keyed or otherwise secured to agitator shaft 14. It may also be noted in connection with Fig. 1 that the entire gear train 44 is carried by a frame 46 which is keyed to and forms a part of spin tube 15 for the basket. As shown most clearly by Fig. 2, the gear frame 46 is also keyed to a spin input tube 47 by a pin 48. Gear frame 46 as well as tube 47 are rotatably supported with respect to casing 13 by a combined axial and radial thrust bearing 49 received in a recess prepared therefor in base plate 20 of the casing. Since frame 46 supports spin tube 15, which in turn carries basket 1, it may be seen that bearing 49 carries the full load of the rotating structure.

Additionally, the input driving shaft 39 along with its pinion 43 and driving pulley 32 are carried by gear frame 46 and the thrust bearing. This arrangement as shown by Fig. 2 comprises upper and lower bearing inserts 50 and 51 respectively. The upper bearing insert 50 includes a flanged shoulder 52 resting on the upper end of the spin input tube 47. Therefore, the input driving shaft 39 is supported on but is rotatable with respect to tube 47.

The hub 53 of the input driving pulley carries an upstanding cylindrical member 54 to accommodate the lubricant seal. While there are numerous lubricant seals well known in the art, we have shown herein by way of example a seal including an annular supporting member 55 secured to the base plate 20 of the casing. Within annular member 55 is a flexible sealing member 56 of leather or like material held in sealing engagement with respect to the hub extension 54 by a retainer 57. An effective seal thus may be provided for retaining a quantity of lubricant within transmission compartment 21.

Input driving shaft 39 includes a driving hub 58 keyed thereto having a cylindrical portion of substantially the same outside diameter as spin input tube 47 and in axially contiguous relation thereto. Encircling both hub 58 and the lower portion of spin tube 47 is a spring clutch 59, here shown as coiled in the form of a left-hand helix. A tab 60 on the lower end of the spring clutch is engaged in a slot 61 in hub 58. Therefore, the spring clutch is always rotated with the input driving member 32. However, when the input driving member rotates in a clockwise direction, as viewed in Fig. 3, the spring tends to unwind, expanding slightly in diameter, and hence it rides loosely on the outer surface of spin drive tube 47. Under these circumstances no appreciable torque is transmitted through the spin drive, but shaft 39 continues to rotate, driving pinion 43, which through the gear train assembly 44 results in oscillation of the agitator shaft 14. However, if the direction of rotation is reversed, spring clutch 59 tends to wind up more tightly and thus grips the exterior surface of the spin input tube to rotate this tube along with gear frame 46 and spin shaft 15 to drive the basket at centrifugal extraction speed.

For effective washing action during agitation, it is desirable that basket 1 remain stationary. However, because of frictional drag, there is a tendency for the spin tube 47 to rotate in a clockwise direction with the input driving shaft 39 during agitation. To restrain rotation of the basket, a brake is provided as illustrated most clearly by Figs. 2 through 4. The brake drum 62 is secured to and forms a part of base plate 20 of the casing. The upper shouldered end 62 of this drum, in cooperation with the upper surface of base plate 20 defines an annular groove to receive a brake band 63 having a lining of friction material 64 thereon. Brake band 63 includes an outwardly extending tab 65 adapted to be engaged by a cooperating snubber member 66. Snubber member 66 has a generally airfoil shape and is pivotally mounted on gear frame 46 by means of a radially outwardly extending pin 67. The snubber member 66 is so mounted on pin 67 that it is free to rotate about its own axis. Both pin 67 and the snubber member are of course rotated in a substantially horizontal plane upon rotation of the spin basket. The airfoil shape of this snubber member in cooperation with the liquid liburicant in the transmission casing results in an arrangement whereby the brake automatically engages itself upon clockwise rotation as viewed in Fig. 3, and automatically disengages itself upon rotation in the spin or counterclockwise direction. Liquid lubricant is sealed within the casing to at least the level of mounting pin 67 for the snubber. As can be clearly seen by an examination of Fig. 4, forward or counterclockwise rotation results in the trailing end of the snubber rising whereby it clears the upper edge of tab 65 of the brake band. However upon cessation of the spin drive and resumption of agitation drive, the snubber returns to its lower position and the basket can rotate no more than one revolution in the clockwise direction whereupon snubber 66 again engages tab 65 as shown to restrain the basket.

As may be seen in Fig. 3, the brake band 63 comprises a discontinuous member fitted around the stationary drum 62. The band 63 due to its internal resilience biases the lining 64 into frictional contact with the drum 62, and this contact normally prevents movement of the brake band. When the tab 65 of the band is engaged by the snubber or pawl 66 during the agitator drive, a braking action is thus applied to the snubber 66 and through the snubber to the gear frame 46 and the basket 1. The basket is thereby effectively restrained from clockwise movement during the washing operation. It will be noted, however, that if an abnormal clockwise force not usually encountered during the washing operation, should be applied to the basket and thus to the snubber 66 and the tab 65, the brake band 63 will slip around the drum 62 upon this abnormal force so that distortion, breakage, or other damage of the braking means does not occur. But during the normal washing action with normal clockwise forces applied to the basket, the brake band does not slip and thereby restrains the basket from clockwise rotation. During the spin operation which occurs upon the counterclockwise rotation of the input shaft 39, there is, of course, no engagement between the snubber 66 and the brake tab 65, the snubber riding over the tab during counterclockwise rotation, and thus no braking action is applied to the basket 1 during the spin operation.

In operation, to wash a load of clothes placed within basket 1, motor 24 is energized to rotate in a clockwise direction looking down on the motor. Under these circumstances, spring clutch 59 overruns so that no driving torque is transmitted to spin drive tube 47. Through the gear train, oscillatory motion of the agitator results from the continuous rotation of input drive shaft 39. Upon conclusion of the washing operation it is necessary merely to reverse the direction of rotation of the driving motor, whereupon the spring clutch 59 tightly engages the exterior of the spin driving tube 47, effectively locking the input shaft and the spin tube together. Thus, the basket is rotated at centrifugal extraction speed. The brake likewise is automatic and is self-energizing during agitation to prevent rotation of the basket. The brake is further self-releasing when the motor is reversed to provide centrifugal extraction drive. Although a spring clutch at 59 is preferred, other types of clutches having a one way driving engagement may be employed. In any event, it can be seen that in accordance with this invention a single driving member is capable of providing a washing motion for one shaft and a continuous rotation or centrifugal extraction motion for a second shaft, merely by control of the direction of motor rotation.

While the invention has been described by reference to a particular embodiment thereof, it is to be understood that numerous modifications may be made by those skilled in the art without actually departing from the invention. We therefore aim in the appended claims to cover all such equivalent variations as come within the true spirit and scope of the invention.

What we claim as new and desire to secure by Letters Patent of the United States is:

1. In a transmission mechanism including a sealed casing and having liquid lubricant therein, a member within said casing rotatable on a substantially vertical axis, a brake band frictionally engaging said casing and having a projecting tab thereon, and a snubber member of airfoil shape with respect to the positive direction of rotation pivotally mounted adjacent its leading edge on said rotatable member radially displaced from the axis thereof and at least partially submerged in the liquid lubricant, the trailing edge of said snubber member being engageable with said brake tab upon rotation of said member in a reverse direction, said trailing edge being elevated by relative motion with respect to the lubricant upon rotation in said positive direction.

2. In a transmission mechanism including a sealed casing and having a liquid lubricant charge therein, a member within said casing rotatable on a substantially vertical axis, a brake band frictionally engaging said casing and having a projecting tab thereon, and a snubber member rotating with said rotatable member and mounted for pivotal movement on a substantially horizontal axis through the leading edge thereof, said snubber member being of airfoil shape with its trailing edge at least partially submerged in the lubricant whereby relative motion of said snubber with respect to the lubricant causes said snubber to move into and out of engagement with said tab dependent upon the direction of rotation.

3. In a transmission including a casing having a liquid lubricant charge therein, a rotatable member within said casing, a brake band frictionally engaging said casing and having a projecting tab thereon, a snubber member of airfoil shape having a leading edge and a trailing edge, and means pivotally mounting said snubber member on said rotatable member for rotation therewith, the pivotal axis of said snubber member being adjacent its leading edge and extending radially from said rotatable member, at least the trailing edge of said snubber being within the liquid lubricant whereby said trailing edge moves away from engagement with said brake tab upon positive rotation and into engagement with said brake tab upon reverse rotation.

4. In a transmission including a casing having a liquid lubricant charge therein, a rotatable member within said casing, a brake band frictionally engaging said casing and having a projecting tab thereon, a snubber member of air foil shape having a leading edge and a trailing edge, means pivotally mounting said snubber on said rotatable member for rotation therewith, at least the trailing edge of said snubber being within the liquid lubricant whereby said trailing edge moves away from engagement with said brake tab upon positive rotation and into engagement with said brake tab upon reverse rotation.

References Cited in the file of this patent

UNITED STATES PATENTS

| | | |
|---|---|---|
| 2,161,604 | Watts | June 6, 1939 |
| 2,346,152 | Clark | Apr. 11, 1944 |
| 2,346,669 | Dunham | Apr. 18, 1944 |
| 2,685,350 | Falk | Aug. 3, 1954 |
| 2,751,773 | Woodson | June 26, 1956 |
| 2,807,951 | Gerhardt et al. | Oct. 1, 1957 |